United States Patent
Minnick

(10) Patent No.: US 8,087,057 B2
(45) Date of Patent: Dec. 27, 2011

(54) TELEVISION CONVERTER DEVICE INCLUDING AN INTERNET PROTOCOL INTERFACE

(75) Inventor: Danny Jean Minnick, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 546 days.

(21) Appl. No.: 11/965,842

(22) Filed: Dec. 28, 2007

(65) Prior Publication Data

US 2008/0216138 A1 Sep. 4, 2008

Related U.S. Application Data

(63) Continuation-in-part of application No. 11/118,220, filed on Apr. 28, 2005.

(51) Int. Cl.
*H04N 5/445* (2006.01)
(52) U.S. Cl. ........... 725/110; 725/51; 725/109; 725/112
(58) Field of Classification Search .................. 725/109, 725/110, 112, 51
See application file for complete search history.

(56) References Cited

U.S. PATENT DOCUMENTS

| | | | |
|---|---|---|---|
| 4,957,719 A | 9/1990 | Strubbe et al. | |
| 5,434,626 A | 7/1995 | Hayashi et al. | |
| 5,453,796 A | 9/1995 | Duffield et al. | |
| 5,699,125 A | 12/1997 | Rzeszewski et al. | |
| 5,768,359 A | 6/1998 | Metz et al. | |
| 5,900,916 A | 5/1999 | Pauley | |
| 6,005,565 A | 12/1999 | Legall et al. | |
| 6,031,580 A | 2/2000 | Sim | |
| 6,055,023 A | 4/2000 | Rumreich et al. | |
| 6,061,719 A * | 5/2000 | Bendinelli et al. | 709/218 |
| 6,133,910 A * | 10/2000 | Stinebruner | 725/49 |
| 6,212,680 B1 | 4/2001 | Tsinberg et al. | |
| 6,317,791 B1 | 11/2001 | Cohn et al. | |
| 6,321,382 B1 | 11/2001 | Wugofski | |
| 6,324,694 B1 | 11/2001 | Watts et al. | |
| 6,326,982 B1 * | 12/2001 | Wu et al. | 715/718 |
| 6,334,217 B1 | 12/2001 | Kim et al. | |
| 6,405,372 B1 | 6/2002 | Kim et al. | |
| 6,473,135 B1 | 10/2002 | Iwamura | |
| 6,526,583 B1 | 2/2003 | Auld et al. | |
| 6,622,307 B1 | 9/2003 | Ho | |
| 6,622,907 B2 | 9/2003 | Fanti et al. | |
| 6,675,388 B1 | 1/2004 | Beckmann et al. | |
| 6,681,396 B1 | 1/2004 | Bates et al. | |
| 6,804,827 B1 | 10/2004 | Furukawa et al. | |

(Continued)

OTHER PUBLICATIONS

Interactive Television, http://www.dishnetwork.com/content/our_products/interactive_tv/index.shtml, Nov. 29, 2007, 1 page.

(Continued)

*Primary Examiner* — James R Sheleheda
*Assistant Examiner* — Timothy R Newlin
(74) *Attorney, Agent, or Firm* — Dorsey & Whitney LLP

(57) ABSTRACT

A television converter device is provided which includes a channel selector and an Internet Protocol (IP) interface. The channel selector is configured to receive multiple channels of television programming from at least one of a satellite, cable, and over-the-air broadcasting source, select one of the channels from the multiple channels, and deliver the selected channel to at least one television (TV). The IP interface is configured to receive television programming over an IP connection, and to deliver the television programming received over the IP connection to the at least one TV.

22 Claims, 13 Drawing Sheets

U.S. PATENT DOCUMENTS

| | | | |
|---|---|---|---|
| 7,130,576 B1 | 10/2006 | Gurantz et al. | |
| 7,395,546 B1 | 7/2008 | Asmussen | |
| 2001/0027555 A1 | 10/2001 | Franken et al. | |
| 2002/0012069 A1 | 1/2002 | Murakami et al. | |
| 2002/0067438 A1 | 6/2002 | Baldock | |
| 2002/0144289 A1* | 10/2002 | Taguchi et al. | 725/112 |
| 2002/0184620 A1 | 12/2002 | Davies et al. | |
| 2003/0005463 A1* | 1/2003 | Macrae et al. | 725/112 |
| 2003/0023987 A1 | 1/2003 | Hiramoto et al. | |
| 2003/0093804 A1* | 5/2003 | Chang et al. | 725/95 |
| 2003/0159157 A1 | 8/2003 | Chan | |
| 2003/0204853 A1 | 10/2003 | Fries et al. | |
| 2003/0217362 A1 | 11/2003 | Summers et al. | |
| 2004/0091249 A1 | 5/2004 | Mekenkamp et al. | |
| 2004/0255326 A1* | 12/2004 | Hicks et al. | 725/81 |
| 2004/0255336 A1 | 12/2004 | Logan et al. | |
| 2004/0268406 A1 | 12/2004 | Sparrell et al. | |
| 2005/0005300 A1 | 1/2005 | Putterman et al. | |
| 2005/0071882 A1 | 3/2005 | Rodriguez et al. | |
| 2005/0123326 A1 | 6/2005 | Makofka | |
| 2005/0144646 A1 | 6/2005 | Lecrom et al. | |
| 2005/0144651 A1 | 6/2005 | Prus et al. | |
| 2005/0190777 A1 | 9/2005 | Hess et al. | |
| 2005/0235323 A1 | 10/2005 | Ellis et al. | |
| 2007/0186249 A1 | 8/2007 | Plourde et al. | |
| 2008/0184327 A1 | 7/2008 | Ellis et al. | |

OTHER PUBLICATIONS

Dish Network, ITV-What's New, http://www.dishnetwork.com/content/our_products/interactive_tvwhats_new/index.sht ml, Nov. 29, 2007, 2 pages.

Office Action dated Nov. 9, 2009, U.S. Appl. No. 11/673,383, 9 pages.

Response to Office Action dated Feb. 2, 2010, U.S. Appl. No. 11/673,383, 9 pages.

Final Office Action dated May 17, 2010, U.S. Appl. No. 11/673,383, 10 pages.

Request for Continued Examination and Response to Final Office dated Aug. 17, 2010, U.S. Appl. No. 11/673,383, 12 pages.

Office Action dated Mar. 16, 2011, U.S. Appl. No. 11/673,383, 9 pages.

Amendment and Response to Office Action dated May 24, 2011, U.S. Appl. No. 11/673,383, 9 pages.

Office Action (Restriction Requirement) dated Jan. 21, 2009, U.S. Appl. No. 11/118,820.

Response to Office Action dated Feb. 20, 2009, U.S. Appl. No. 11/118,820, 3 pages.

Office Action dated Jun. 10, 2009, U.S. Appl. No. 11/118,820, 25 pages.

Response to Office Action dated Sep. 10, 2009, U.S. Appl. No. 11/118,820, 25 pages.

Final Office Action dated Jan. 7, 2010, U.S. Appl. No. 11/118,220, 29 pages.

Request for Continued Examination and Response to Final Office Action dated Apr. 2, 2010, 15 pages.

Office Action dated Aug. 5, 2010, U.S. Appl. No. 11/118,220, 17 pages.

Response to Office Action dated Nov. 5, 2010, U.S. Appl. No. 11/118,220, 15 pages.

Final Office Action dated Jan. 24, 2011, U.S. Appl. No. 11/118,220, 14 pages.

Amendment and Response to Final Office Action dated Mar. 21, 2011, U.S. Appl. No. 11/118,220, 9 pages.

Notice of Allowance and Fee(s) Due dated Apr. 18, 2011, 5 pages.

Final Office Action dated Aug. 8, 2011, U.S. Appl. No. 11/673,383, 9 pages.

Request for Continued Examination dated Jul. 18, 2011, U.S. Appl. No. 11/118,220, 1 page.

* cited by examiner

TELEVISION CONVERTER DEVICE INCLUDING AN INTERNET PROTOCOL INTERFACE

CROSS-REFERENCE TO RELATED APPLICATIONS

This application is a continuation-in-part of U.S. patent application Ser. No. 11/118,220, entitled "DEVICE COMPRISING MULTIPLE CHANNEL SELECTORS" and filed Apr. 28, 2005, which claims the benefit of U.S. Provisional Application No. 60/566,300, entitled "DEVICE COMPRISING MULTIPLE CHANNEL SELECTORS" and filed Apr. 28, 2004. Each of these applications is hereby incorporated herein by reference in its entirety.

BACKGROUND

Most modern entertainment systems now include a television converter device, often in the form of a set-top-box (STB), as well as a television (TV). While TVs typically include tuners capable of selecting a channel of television programming from the multitude of channels broadcasted over the air (typically via an attached TV antenna), STBs have become standard equipment for accessing and selecting channels of television programming provided by alternate distribution services such as cable and direct-to-home satellite services.

STBs typically contain some kind of a channel selector, a control means, and typically a separate remote controller, for the user to give instructions to the STB. Channel selectors could take any form, ranging from a simple radio tuner to complex and specially designed hardware and software devices. In simple terms, channel selectors can select any channel or television programming from the multiple channels delivered to the STB by the programming distributor and then deliver that channel of television programming to the TV in a form that the TV is able to recognize and subsequently display (typically via channel 3 or 4 on the TV's tuner or via a separate baseband input). Current industry practice is for a programming distributor to provide each subscriber with one STB (with one channel selector) for each of the subscriber's TVs.

Modern STBs now support a wide array of functions and services that go beyond simple channel selection. It is now common for STBs to also be digital video recorders (DVRs) through the internal or external inclusion of a hard drive or other storage device, along with the associated control hardware and software. Many STBs also allow users to directly order pay-per-view movies from the programming distributor via a modem connected to a telephone line at the subscriber's location. Increasingly, STBs store information related to certain user preferences that increase user friendliness of the service. It has also become important that STBs provide users with some means of blocking undesirable television programming.

The trend in STB design is to include more and more components and functionalities in the STB. There is an economic incentive for this trend, as including an additional component in the STB is cheaper than providing that component as a standalone device. In addition, there is an operational incentive as the STB manufacturer can ensure that an included component will operate correctly with the other included components, thus increasing customer satisfaction with the overall product. Lastly, many consumers find entertainment systems with a large number of standalone components difficult to use.

As the trend has continued, several problems with the typical STB have been identified. One problem with STBs is associated with the recent development of the picture-within-a-picture functionality found on some TVs, sometimes also referred to as picture-on-picture or picture-in-picture (PIP) display. PIP display allows a user to watch two channels at the same time: typically with one channel shown in a substantially smaller window that overlays the other displayed channel that is shown on the main TV screen. This functionality, however, requires the use of an extra tuner or channel selector for each additional channel to be displayed. The additional channel selectors proportionally increase the cost of the devices, be it a TV or STB, even though the second channel selector remains idle most of the time.

Yet another drawback to typical STBs is the inability to perform housekeeping functions, such as downloading system information, software updates, menus, and any content to be stored and displayed later or uploading stored information such as user viewing information and system performance information, while the STB is in use. As STBs have become more complicated, the need for performing such housekeeping functions has drastically increased. Most housekeeping functions, especially those that require the downloading of information embedded in a channel, require the use of a channel selector. However, because modern STBs typically contain a single channel selector, housekeeping functions requiring a channel selector cannot be performed while the channel selector is in use delivering television programming.

Programming distributors currently get around this problem in one or both of two ways. One way is to insert such housekeeping information in every channel of content delivered. Therefore, regardless of whether the channel selector is in use or not, housekeeping information is always available. This is a simple solution but is clearly an inefficient use of bandwidth. Another way is to wait until the STB is turned off to perform housekeeping functions. This, however, means performance of the housekeeping functions must then be dependent upon the user's use habits, which could prevent the functions from being performed in a timely manner. In addition, many users leave their STBs on all the time thereby preventing the performance of such housekeeping functions.

Another problem with modern STBs is referred to as "tuner delay." It takes all tuners and channel selectors a finite amount of time to "tune" from one channel to another. For example, a satellite STB can take up to two seconds to display a new channel after the receipt of a channel change command, during which time nothing is being delivered to the TV. This tuner delay is perceived by the subscriber and can be the source of much frustration on the subscriber's part. Better quality electronics can be used to reduce tuner delay, but the delay cannot be eliminated. In addition, such better quality electronics are also subject to the law of diminishing returns and they can typically cost much more than a lower quality tuner, for only an incremental decrease in tuner delay.

Programming distributors have also determined that it is now a problem that STBs can only support one TV. Although the additional functions have proved to be very popular with consumers, they have drastically increased the cost and complexity of STBs. For example, the cost of including an internal storage device can substantially increase the manufacturing cost of the STBs.

Further, while each STB typically is capable of conveniently delivering a multitude of channels to a consumer, programming currently available from other sources, such as that not transmitted via a direct-to-home satellite, is not available through the STB, requiring the use of additional equipment coupled with a TV or similar display to receive such programming.

SUMMARY OF THE INVENTION

In one embodiment of the invention, a television converter device includes a channel selector configured to receive multiple channels of television programming from at least one of a broadcast satellite, a cable broadcast system, and an over-the-air terrestrial broadcast station, to select one of the channels from the multiple channels, and to deliver the selected channel to at least one television (TV). Further included is an Internet Protocol (IP) interface configured to receive television programming over an IP connection, and to deliver the television programming received over the IP connection to the at least one TV.

Another embodiment is a method for receiving television programming. In the method, multiple channels of television programming are received from a satellite, cable, or over-the-air terrestrial broadcasting source. One or more of the multiple channels of television programming is selected and delivered to at least one TV. Television programming is also received over an IP connection and delivered to the at least one TV.

DETAILED DESCRIPTION

Figure 1A:
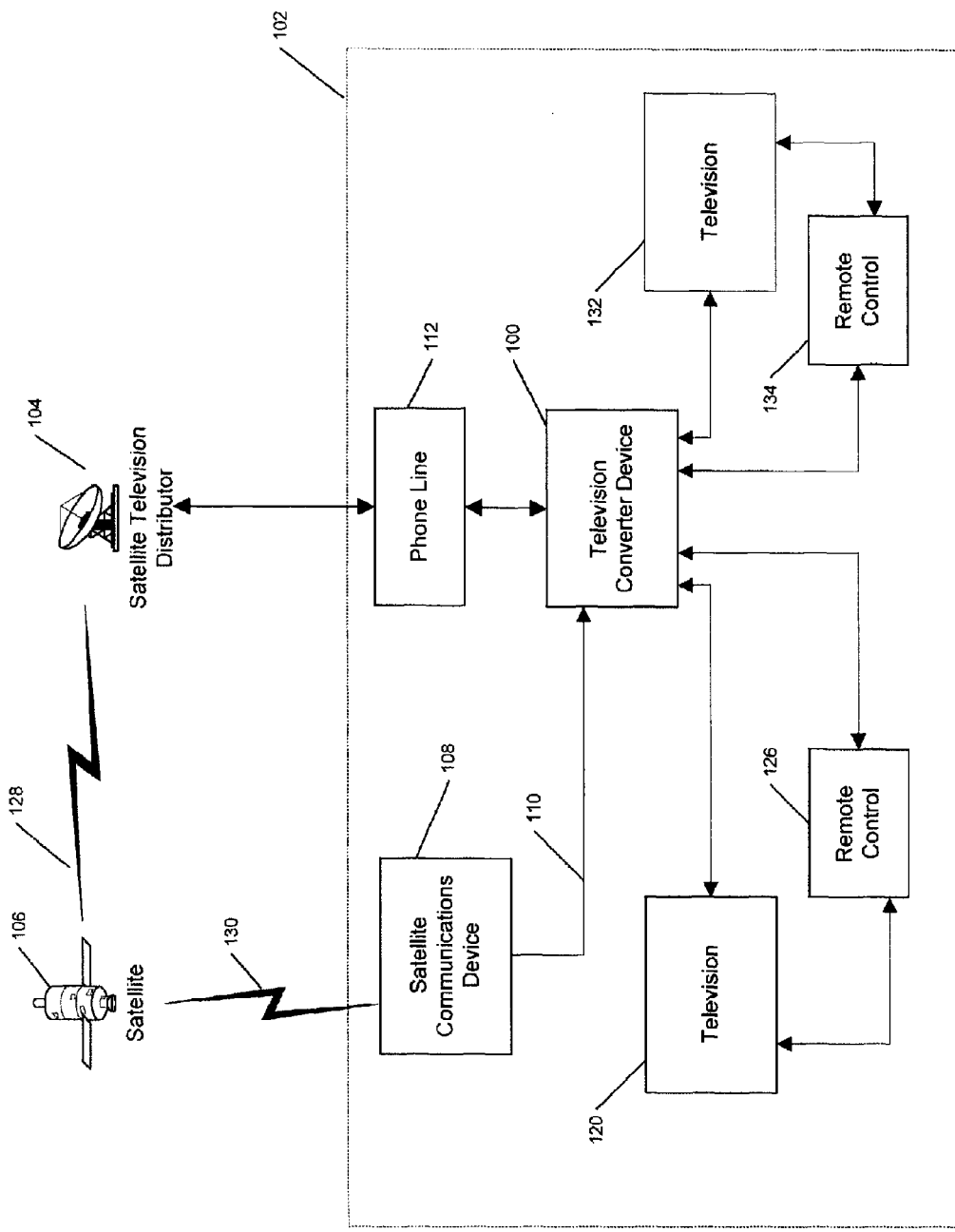
FIG. 1a illustrates an entertainment system utilizing an STB in accordance with an embodiment of the invention.

In this specification, the present invention will be described using methods and systems related to subscriber satellite television service. This specific description is not meant to limit the invention to that one embodiment. The present invention may also be applicable to cable television systems, broadcast television systems or other television systems. The present invention is also described in terms of digital video recorder (DVR) devices. The present invention may also be applicable to digital-versatile-disc (DVD) recording devices or other television recording devices. One skilled in the art will recognize that the present invention can apply elsewhere. While the invention has been particularly shown and described with reference to preferred embodiments thereof, it will be understood by those skilled in the art that various other changes in the form and details may be made therein without departing from the scope of the invention.

As a general matter, the disclosure uses the term "signal." One skilled in the art will recognize that the signal may be any digital or analog signal. Those signals may include, but are not limited to, a "bit" (binary digit), a specified set of bits, an alternating current (A/C) signal, or a direct current (D/C) signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "television converter," "receiver," "STB," "television receiving device," "television receiver," "television recording device," "satellite STB," "satellite receiver," "cable STB," "cable receiver," and "television tuner" to refer interchangeably to a converter device or electronic equipment that has the capacity to acquire, process and distribute one or more television signals transmitted by over-the-air broadcast, cable, telephone, or satellite distributors. DVR and "personal video recorder (PVR)" refer interchangeably to devices that can record and play back television signals and that may implement trick functions including, but not limited to, fast-forward, rewind and pause. As set forth in this specification, and the figures pertaining thereto, DVR and PVR functionality or devices may be combined with a television converter. The signals transmitted by these broadcast, cable, telephone or satellite distributors may include, individually or in any combination, Internet, radio, television or telephonic data or information. One skilled in the art will recognize that a television converter device may be implemented as an eternal self-enclosed unit, a plurality of external self-enclosed units or as an internal unit housed within a television. One skilled in the art will recognize that the present invention can apply to analog and digital satellite STBs.

As yet another general matter, it will be understood by one skilled in the art that the term "television" refers to a television set or video display that may contain an integrated television converter device (e.g., an internal cable-ready television tuner housed inside a television) or, alternatively, that is connected to an external television converter device (e.g., an external STB connected via cabling to a television). A further example of an external television converter device is the EchoStar Dish PVR 721, Part Number 106525, combination satellite STB and DVR.

Finally, as a general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel."

The term "channel," as used in this description, carries a different meaning from its normal connotation. In broadcast television, different analog signals of a television station may be carried on a carrier frequency and its sub-channels. A tuner in a television may then acquire and process these signals. In broadcast television, the term "channel" has thus become synonymous with the sub-channel or the station on that sub-channel. The normal connotation of the term "channel" is therefore not always appropriate to describe satellite television transmissions where multiple stations may be multiplexed onto a signal carrier frequency. Satellite television distributors, however, may organize the satellite data into a group of different "virtual channels." These virtual channels give the impression that the satellite television programs (the service providers) are placed in channels. This impression may assist user operation of the satellite STB since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may employ.

Turning now to the Drawings, wherein like numbers denote like parts throughout the several views, FIG. 1a presents an embodiment of an entertainment system 102 that includes a television converter device 100 in the form of a satellite STB (STB). Generally, the satellite STB 100 may receive one or more television signals from a cable television distributor, from a broadcast television distributor or from a satellite television distributor 104. As a preferred embodiment, entertainment system 102 receives signals from satellite television distributor 104. One skilled in the art will recognize that STB 100 may also receive video-digital subscriber line (DSL), Internet, wireless and other signals from content or video distributors. The satellite STB 100 may process television signals and may send the processed signals to one or more peripheral electronic devices, such as televisions 120, 132 and remote controls 126, 134. The satellite STB 100 also may accept commands from remote controls 126, 134 or other peripheral electronic devices. More detail about the functionality of the satellite STB 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the entertainment system 102, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 MHz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite STB 100 may be possible.

Figure 1B:
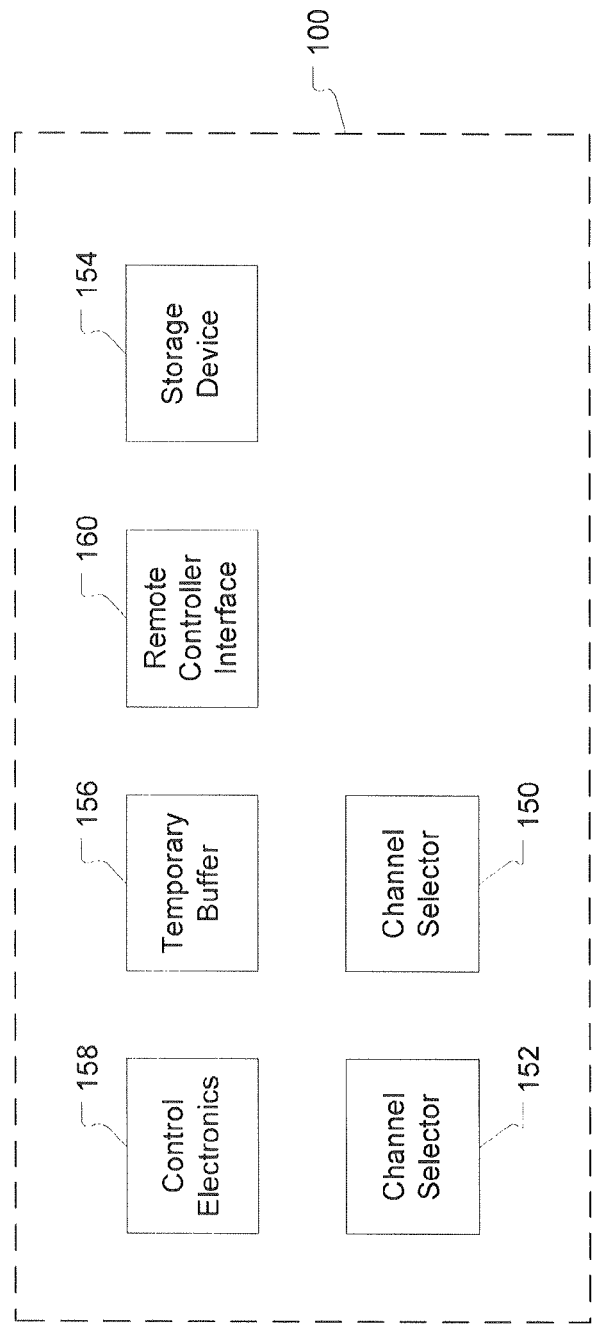
FIG. 1b is a functional block diagram of the logical elements of an STB comprising an embodiment of the invention.

FIG. 1b illustrates a high-level block diagram showing some of the logical elements of an STB 100 in accordance with one embodiment of the present invention. FIG. 1b illustrates an embodiment of the STB 100 that contains two channel selectors 150, 152. It will be understood by the reader that the methods and apparatuses described herein will be equally applicable to embodiments that contain any number of channel selectors greater than one channel selector.

In the embodiment shown in FIG. 1b, the STB 100 also contains an internal storage device 154. The storage device 154 is capable of recording and storing television programming provided by any of the channel selectors 150, 152. The storage device 154 is further adapted to retrieve stored television programming and deliver it to any TV 120, 132 connected to the STB 100. In embodiments, the STB 100 may also include at least one temporary buffer 156. This buffer may comprise RAM or may simply be a portion of the storage device 154. The buffer 156 may be used to manage the flow of television programming to the storage device 154 and, in some embodiments, to the connected TVs 120, 132.

The STB 100 also contains control electronics 158 that control the operation of the channel selectors 152, 150 and the other logical elements contained in the STB 100. The control electronics 158 may be one or more of a multitude of commercially available processors such as the Motorola™ 68000 or a processor from the Intel™ Pentium™ family. In addition, the control electronics 158 may be any type of custom ASIC, such as from the LSILogic G11 family, or FPGA, such as from the Altera Stratix™ family. In addition, the control electronics 158 may include discrete electronic components combined into a single circuit. The control electronics 158 may operate under the control of a software program, firmware program, or other program stored in memory or control logic. One skilled in the art will recognize that other embodiments of the control electronics 158 are possible. In the embodiment shown in FIG. 1*b*, the control electronics also include a modem for interfacing with the telephone line 112.

The STB 100 contains a remote controller interface (RCI) 160. The RCI 160 is capable of receiving commands from the STB's remote controllers 126, 134 and relaying them to the control electronics. In some embodiments, the RCI 160 may also send commands to the various remote controllers. In embodiments, at least one remote controller specific to each display device supported by the STB 100 is required. The STB 100 is able to identify the individual remote controllers and deliver programming to their associated TV. In one embodiment, each remote controller, when sending a command to the STB 100, also sends a unique identifier that indicates which TV the command relates to. This is but one example; other means of associating specific remote controllers with specific TVs are well known in the art and applicable here. As noted before, it is typical for remote controllers to include IR or UHF transmitters for wireless communication with the STB 100. Because it is assumed that in any particular instance no more than one TV will be collocated with the STB 100, UHF transmitters are used in remote controllers of TVs not collocated with the STB 100. This is because UHF signals can easily penetrate walls of a typical home and communicate with a distant STB 100, whereas IR signals cannot. For embodiments wherein the STB 100 is designed to be located in the basement or some other central location, all remote controllers use a UHF transmitter. It should be noted that UHF transmitters are but one example of a means for relaying information to an STB 100 located in a different room at a subscriber location. Other examples include wireless local area network (LAN) protocols such as Bluetooth, all of which are applicable here.

As FIG. 1*b* shows, each channel selector 150, 152 in the STB 100 is shown as an independent element. The channel selectors can tune to or 'select' specific channels within the incoming signal 110 and deliver it to the internal storage device 154, the temporary buffer 156 or any connected TV 120, 132 or display device as directed by the control electronics 158. The channel selectors 150, 152 are each a device or set of devices that processes the signal 110 provided by the satellite communication device 108. In other words, each channel selector 150, 152 may include demodulators, decoders, demultiplexers, and data packet selectors. One skilled in the art would recognize that the channel selectors 150, 152 may include fewer, more, or different components. The term channel selector 150, 152 is used herein to avoid confusion and remind the reader that the invention applies equally to analog and digital television receiver 100.

Of interest here is the independence and interchangeability of the channel selectors 150, 152 as they are used by the STB 100. Thus, in the two channel selector embodiment shown in FIG. 1*b*, at any given time any of the channel selectors may be idle, delivering television programming to one or more connected TVs 120, 132, delivering programming as a PIP display to one or more connected TVs 120, 132, delivering television programming to the internal storage device, delivering programming to the temporary buffer, or performing housekeeping functions. The only limiting factor is that each channel selector 150, 152 may only select and deliver programming from one channel at a time. FIGS. 2 through 5 describe specific embodiments and give specific examples further illustrating the independence and interchangeability of the multiple channel selectors.

In the embodiments shown in FIG. 1*a* and FIG. 1*b*, the STB 100 in accordance with the present invention is implemented as a stand-alone device. One skilled in the art will recognize that the present invention may be implemented in any number of ways and need not be a stand alone device proximate to a TV. For example, the STB 100 may be a stand-alone device designed to be located in a basement or some other central point at the subscriber's location that allows convenient connection to various devices in other rooms at the location. As another example, embodiments of the present invention may be implemented as part of a central home theater device that includes a display device and stereo sound system. A further example would be a home digital video storage library device, such as a DVD player with large capacity storage device, or a portal device to a remote video library. Such a library device would utilize the present invention to allow all the TVs at the subscriber's location to independently access television programming stored on or transmitted through the library device.

Furthermore, one skilled in the art will recognize that there are many different electronic means for implementing the present invention, regardless of the component, device or location of the STB. Such means include software means comprising software that can be executed at need on a processor within a component comprising the necessary hardware elements, firmware means wherein a fixed set of commands to be executed by a processor is embedded with the control circuitry of a component, hardware means wherein the present invention is expressed as fixed circuits that perform the functions, when operated, or some combination of software, firmware and hardware means. From this discussion it should be clear that the present invention is directed more towards the functions and methods performed by the STB 100 than towards any specific means or devices for executing those functions.

FIGS. 2 through 5 show functional block diagrams of various STB embodiments of the present invention to illustrate the functionality of the present invention. Not shown in the FIGS. are those common elements of the STB that are not central to the illustration of the functionality of the present invention including, for example, the control electronics, the RCI, power supply, and cooling fan.

Figure 2:
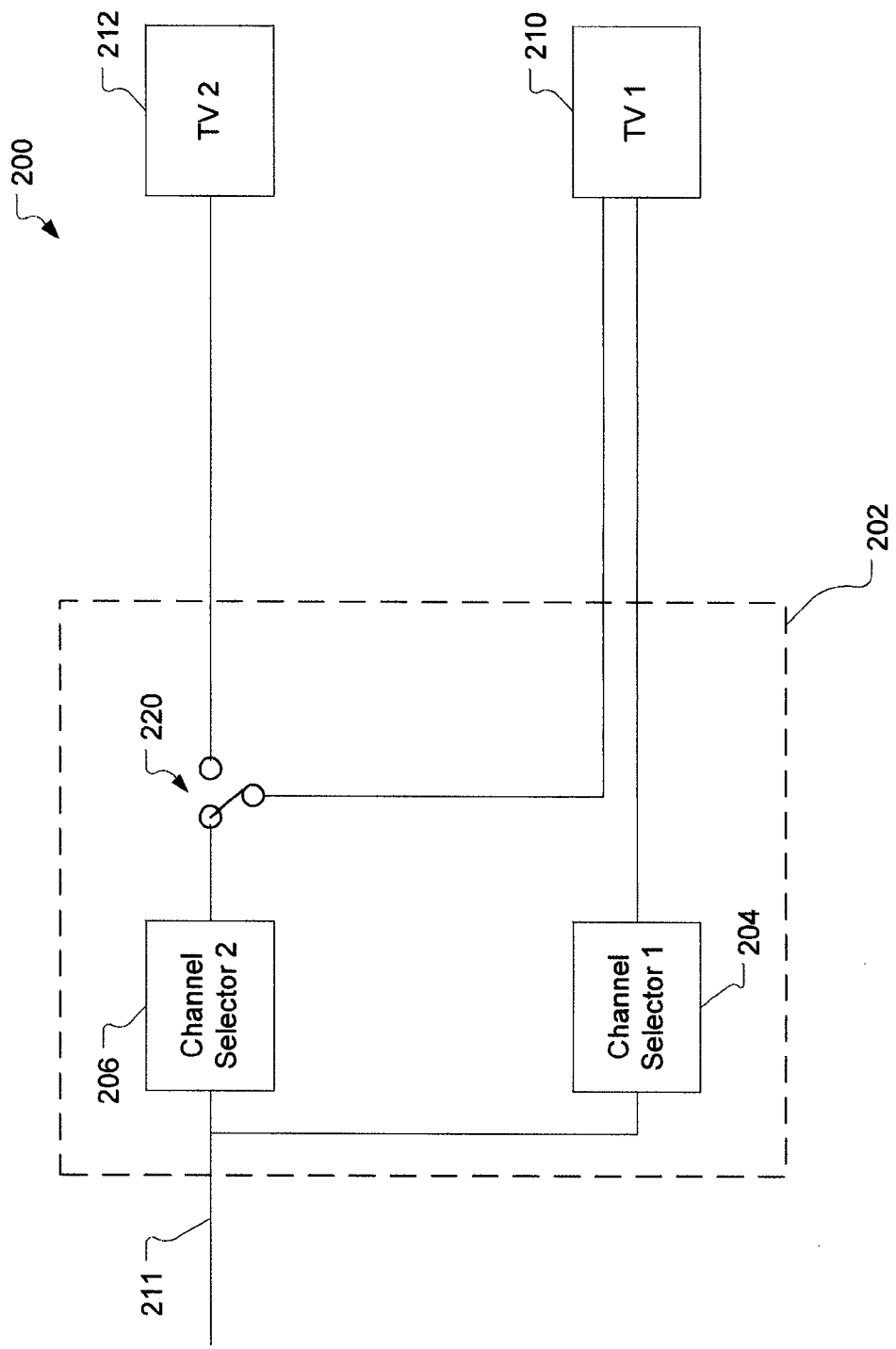
FIG. 2 illustrates a functional block diagram of one embodiment of an STB with two channel selectors in accordance with the present invention.

FIG. 2 shows a functional block diagram of one simple embodiment 200 of an STB 202 in accordance with the present invention capable of independently delivering television programming to two connected TVs (TV 1 210, and TV 2 212) and in addition provide PIP functionality to TV 1 210. The STB 202 receives a signal 211, such as the filtered signal 110, containing multiple channels of television programming from a programming distributor. The STB 202 is equipped with two channel selectors (channel selector 1 204, and channel selector 2 206). The channel selectors 204, 206 each are able to select one channel of television programming from those that are contained in the signal 211 and deliver the selected channel of television programming to a connected TV or other device.

One skilled in the art will realize that the exact design of a channel selector can vary depending on the nature of the signal 211 of multiple channels (i.e., whether the television programming is in a digital or analog form, etc.). For example, a channel selector may include a digital decoder to change digital television programming (e.g. an MPEG-2 video signal as used by some direct-to-home satellite programming distributors) to an analog television programming signal (referred to as a baseband signal). Channel selectors for use with digital television programming will also have some amount of onboard buffering capacity, usually in the form of one or more RAM chips. In addition, the above channel selector may further include an NTSC encoder. NTSC encoders are used to modulate a baseband signal onto a channel 3 or channel 4 carrier frequency that subsequently can be displayed by TVs tuned to those channels. Channel selectors, digital decoders and NTSC encoders are well known in the art and need not be described further herein.

In the embodiment shown in FIG. 2, channel selector 1 204 is directly connected to TV 1 210 and is dedicated to delivering television programming to TV 1. Channel selector 2, however, can be connected to either TV via a switch 220. This switch 220 illustrates the STB's ability to switch between 2 modes: a PIP mode and a two-TV mode. While in two-TV mode, channel selector 2 is connected through the switch 220 to TV 2 212. Thus, while in this mode the STB 202 independently supports both TVs, and each user is capable of viewing any channel available without interfering with the delivery of television programming to the other TV. For example, a user viewing one TV can view or select any channel the user desires regardless of, and without interfering with, what the user of the second TV is viewing.

While in PIP mode, channel selector 2 206 is connected through the switch 220 to TV 1 210. In this configuration, channel selector 2 206 is capable of delivering television programming as a PIP display on TV 1 210 within that television programming that is delivered by channel selector 1 204.

While a simple switch 220 is used to illustrate the ability of the STB 202 to switch the channel selectors between modes, one skilled in the art will realize that the switch 220 is merely illustrative and that some additional standard electronics, including PIP display circuitry, would be necessary to effectuate the functionality. However, such PIP display circuitry and other video signal combination and switching circuitry is well known in the art and need not be shown or discussed here in detail to adequately describe the present invention.

Another embodiment (not shown) of the present invention is a simple variation of the embodiment shown in FIG. 2. In the embodiment, channel selector 1 204 is also provided with a switch thus allowing PIP functionality to be available to both TV 1 210 and TV 2 212. The embodiment can be considered to have three modes of operation: a PIP mode for TV 1; a PIP mode for TV 2; and a two-TV mode.

Yet another embodiment is using the PIP mode to allow the viewer of one TV to see what is currently being displayed on the other TV, being recorded, or otherwise delivered to some device other than the TV. In this embodiment, the user of TV 1 210 is watching programming being delivered by channel selector 1 204. The user gives a command to the STB 202 to display an indicator of what is currently being delivered by channel selector 2 206, such as, for example, to TV 2 212. The indicator could be a simple information screen that overlays the programming displayed on TV 1 210, the information screen displaying textual information, such as an EPG entry indicating the channel and current programming being delivered by channel selector 2 206. Alternatively, the indicator could be a PIP display overlaying part of the programming on TV 1 210, the PIP display showing the current television programming being delivered by the other channel selector. In the PIP embodiment, the PIP display on TV 1 210 and the programming delivered to the other device or TV 2 212 are being simultaneously delivered by the second channel selector 212.

This feature allows a parent to monitor what children are viewing on the other TV, or what children are having recorded. Another use is to periodically monitor the recording of a live event of unknown duration. When used as a parental control, it is also beneficial to allow the user of TV 1 210 to cease or otherwise interrupt the delivery of the second channel of television programming to TV 2 212.

Figure 3:
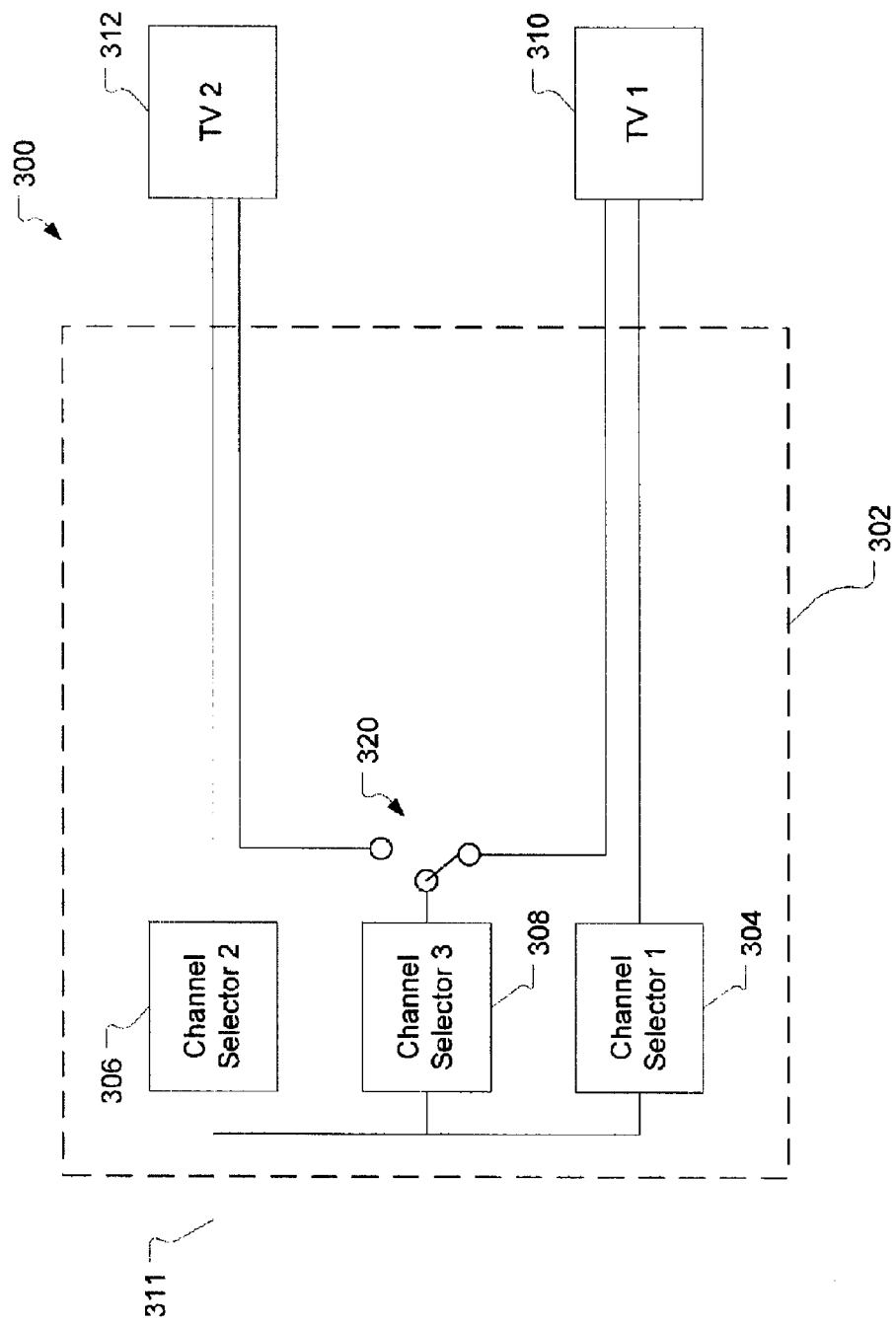
FIG. 3 illustrates a functional block diagram of one embodiment of an STB with three channel selectors in accordance with the present invention.

FIG. 3 shows a functional block diagram of another embodiment 300 of an STB 302 in accordance with the present invention capable of independently delivering television programming from an input multi-channel signal 311, such as signal 110, to two connected TVs (TV 1 310, and TV 2 312) and in addition provide PIP functionality to either connected TV. In the embodiment, the STB 302 is provided with three channel selectors. Channel selector 1 304 is dedicated to delivering television programming to TV 1 310 and channel selector 2 306 is dedicated to delivering television programming to TV 2 312. Channel selector 3 308, however, through a switch 320 may deliver television programming to either TV 1 310 or TV 2 312. Thus, the embodiment shown in FIG. 3 may switch between several modes also: two-TV mode (wherein channel selector 3 308 is idle); two-TV mode with PIP display on TV 1 310; and two-TV mode with PIP display on TV 2 312.

Figure 4:
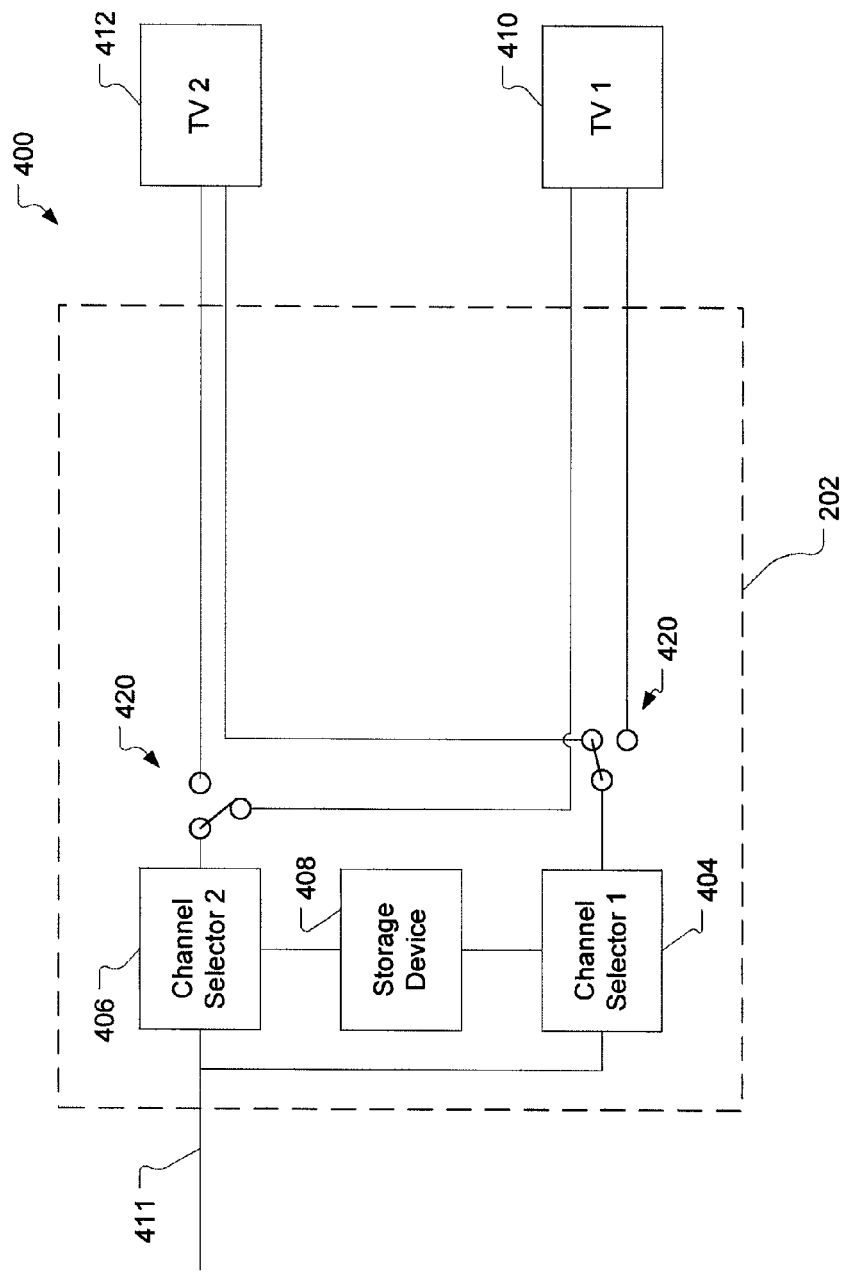
FIG. 4 illustrates a functional block diagram of one embodiment of an STB with two channel selectors and an internal storage device in accordance with the present invention.

FIG. 4 presents a slightly more complicated embodiment 400 of an STB 402 that can perform all the functions of the embodiment shown in FIG. 2 as well as independently support the delivery of television programming stored on an internal storage device 408, such as a hard drive. In the embodiment, the STB 402 is provided with two channel selectors capable of receiving a multi-channel signal 411 and delivering therefrom a channel of television programming that can be displayed by a connected TV. Both channel selector 1 404 and channel selector 2 406 may deliver television programming to either TV 1 410 or TV 2 412 (illustrated by the associated switches 420). Thus, similar to the embodiment shown in FIG. 2, the embodiment shown in FIG. 4 may switch between modes including a two-TV mode, a PIP mode on TV 1 410, and a PIP mode on TV 2 412.

FIG. 4 also differs from FIG. 2 by the inclusion of an internal storage device 408 that is connected to both channel selectors 404, 406. In the embodiment shown in FIG. 4, a channel selector is required to deliver television programming that has been stored on the storage device 408. The storage device 408 is connected to both channel selectors such that it is capable of delivering stored television programming to either channel selector. Furthermore, in the embodiment shown, the storage device 408 is a hard drive that has sufficiently fast data retrieval to support the delivery of stored television programming to both channel selectors, allowing the simultaneous viewing of different stored television programming. Thus, the STB 402 in FIG. 4 may deliver either live or stored television programming completely independently of what is being delivered by the other channel selector. For example, while in a PIP mode a viewer could watch stored television programming on the main display and a second different stored television programming on the PIP display.

An additional functionality supported by the embodiment 400 shown in FIG. 4 is the capability of recording one channel of television programming while simultaneously delivering a different channel of television programming to a connected TV. For example, channel selector 1 404 may be delivering television programming to TV 1 410, while channel selector 2 406 is simultaneously delivering a different channel of television programming to the storage device 408 for recording.

Yet another functionality supported by the embodiment 400 shown in FIG. 4 is the capability of substantially simultaneously recording television programming on the storage device 408 (which requires using one channel selector to deliver the television programming to the storage device) and retrieving stored television programming from the storage device 408 for delivery to a TV (using the remaining channel selector). It should be noted that some storage devices 408, such as hard drives, cannot both store and retrieve (i.e., write and read) data simultaneously. However, because of the advances in the speed of hard drives and other storage devices and the availability of buffer memory, it is possible to say, for the purposes of this application, that storage devices can 'substantially simultaneously' store and retrieve data. This is because hard drive speeds and the speeds of other comparable storage devices are now so much faster than the speed at which data needs to be delivered to a TV, and that it is possible, with the use of one or more temporary buffers, for the storage devices to easily keep up with the required data flow rate in a TV application. Methods and apparatuses of storing and retrieving data from hard drives and other storage devices in such a manner are well known in the art and need not be described here.

Figure 5:
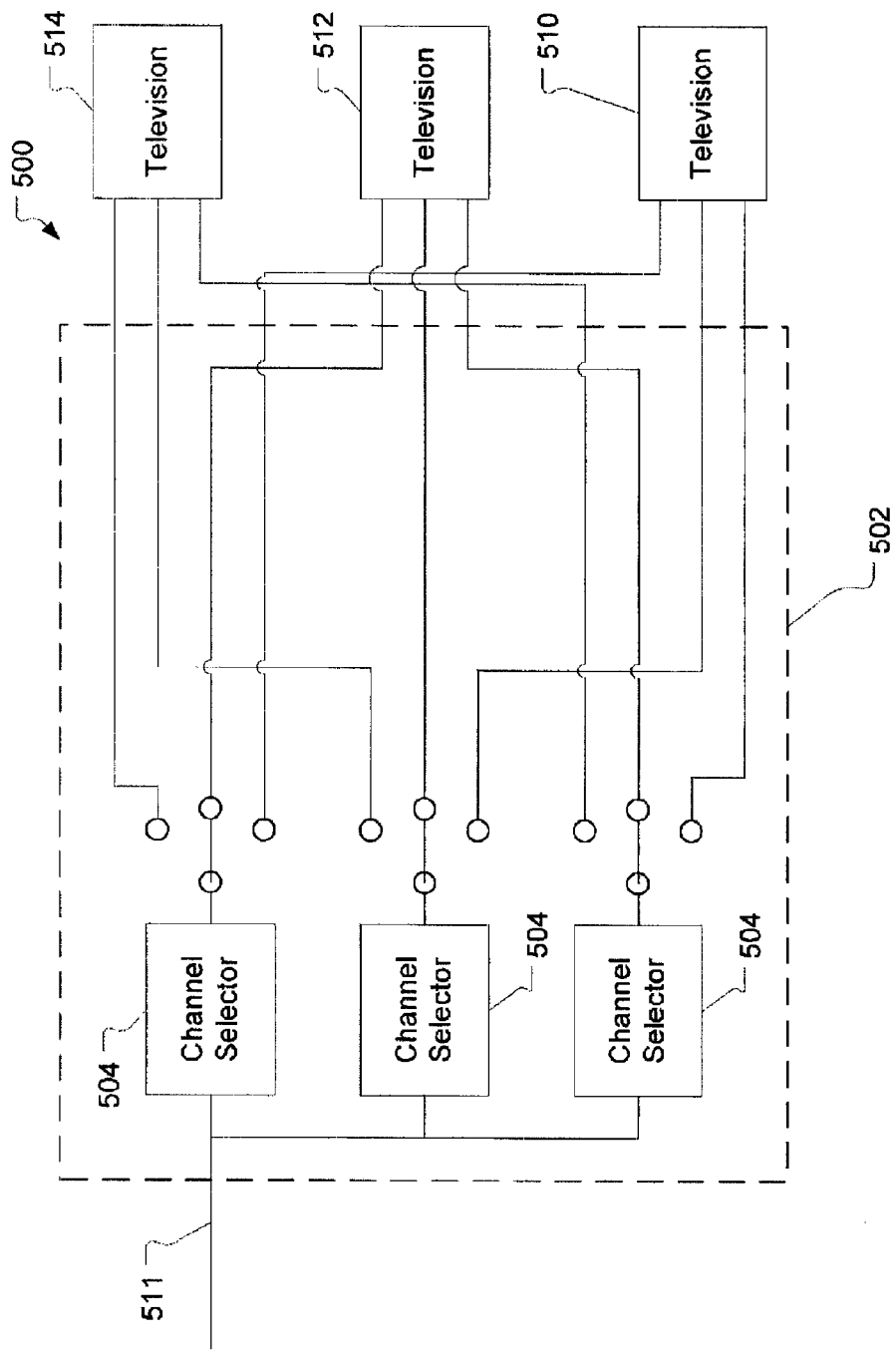
FIG. 5 illustrates a functional block diagram of another embodiment of an STB with three channel selectors in accordance with the present invention.

FIG. 5 illustrates an embodiment 500 of an STB 502 capable of supporting three TVs using three channel selectors that are completely interchangeable. The STB 502 includes three channel selectors 504, each connected to a multi-channel signal 511, such as, for example, signal 110. In the embodiment 500, each channel selector 504 can be switched so that it delivers television programming to any of the three connected TVs 510, 512, 514. Thus, the embodiment 500 shown in FIG. 5 supports a three-TV mode in addition to all the modes described with respect to FIG. 3. In addition, the embodiment supports a single-TV mode with two PIP displays, wherein one channel selector 504 is delivering the main television programming shown on a TV and the other two channel selectors deliver additional channels of television programming as separate PIP displays overlaying the main display.

In the embodiments shown in FIGS. 2 through 5, the channel selectors are shown as being independently connected to TVs to which they are delivering television programming. It should be noted that alternative embodiments achieve the same functionality by replacing the independent connections with a single data bus that interconnects the channel selectors and the TVs. Such alternative methods of routing the television programming from the channel selectors to the various connected display devices are only variations on means of implementation and are within the scope of the invention.

An additional functionality of embodiments of the present invention relates to the performance of housekeeping functions for the device implementing the present invention. As discussed in the background, STBs with a single channel selector typically only perform housekeeping functions when they are 'off,' as it is assumed that when the STB is on, it is in use. For embodiments of the present invention, the multiple channel selectors support the performance of housekeeping functions at any time, as long as a channel selector is currently not in use delivering television programming. Housekeeping can be considered another mode of operation wherein at least one of the multiple channel selectors is delivering housekeeping information, as may be provided on a designated housekeeping channel, and otherwise performing housekeeping operations.

The embodiments were described above as having multiple modes of operation related to what duty each of the channel selectors in any given embodiment was performing. For the broader embodiments, such as that shown in FIG. 5 wherein each channel selector is independent and completely interchangeable with any other channel selector, each channel selector may be performing any one of the following duties:

1. Delivering a channel of television programming from the multi-channel signal to any connected TV or other external device;
2. Delivering a channel of television programming from the multi-channel signal as a PIP display to any connected TV or other external device;
3. Delivering a channel of television programming from the multi-channel signal to an internal storage device for recording and storage;
4. Delivering a channel of television programming from the internal storage device to any connected TV or other external device;
5. Delivering a channel of television programming from the internal storage device as a PIP display to any connected TV or other external device;
6. Performing housekeeping functions; and
7. Idle and standing by for commands.

The above list is but one example of the duties that a manufacturer could have an STB perform with a channel selector. Many variations of this list are possible. Thus, embodiments of the present invention may have as many modes of operation as they have channel selectors multiplied by the number of duties each channel selector may perform.

Because the embodiments above have different modes of operation, one or more methods for changing between modes are required. The simplest method is a manual switch located on the device. Thus, taking the embodiment in FIG. 2 as an example, the switch would set the STB 202 to either the PIP mode or the two-TV mode. A second method is to use a simple protocol that determines which mode will supercede when both are requested. Again taking the embodiment in FIG. 2 as an example, a command to deliver television programming to TV 2 212 would automatically change the STB 202 from the PIP mode to the two-TV mode.

Yet another method is to provide some inactivity detection means that could determine when a channel selector is idle. Embodiments that include such an inactivity detection means support several additional functionalities by allowing intelligent mode changing. For example, in one embodiment whenever it is necessary to perform housekeeping, the next available channel selector could be used to perform this duty 'in the background,' if you will. Thus, the device can be changed into a housekeeping mode without interfering with the subscriber's use or waiting until the device is turned off.

As another example, in other embodiments with an inactivity detection means, no channel selectors are allowed to 'idle' and stand by for further commands (see item 7, above). Rather, a 'home' or favorite channel is selected whenever a channel selector becomes inactive. In some embodiments, this home channel is determined by the user, either by express pre-selection or by the STB based on an analysis of the user's past viewing habits. In other embodiments, the programming distributor determines the home channel. Yet other embodiments use a combination of the above determination methods. In yet other embodiments, the previous channel viewed is selected.

Figure 6:
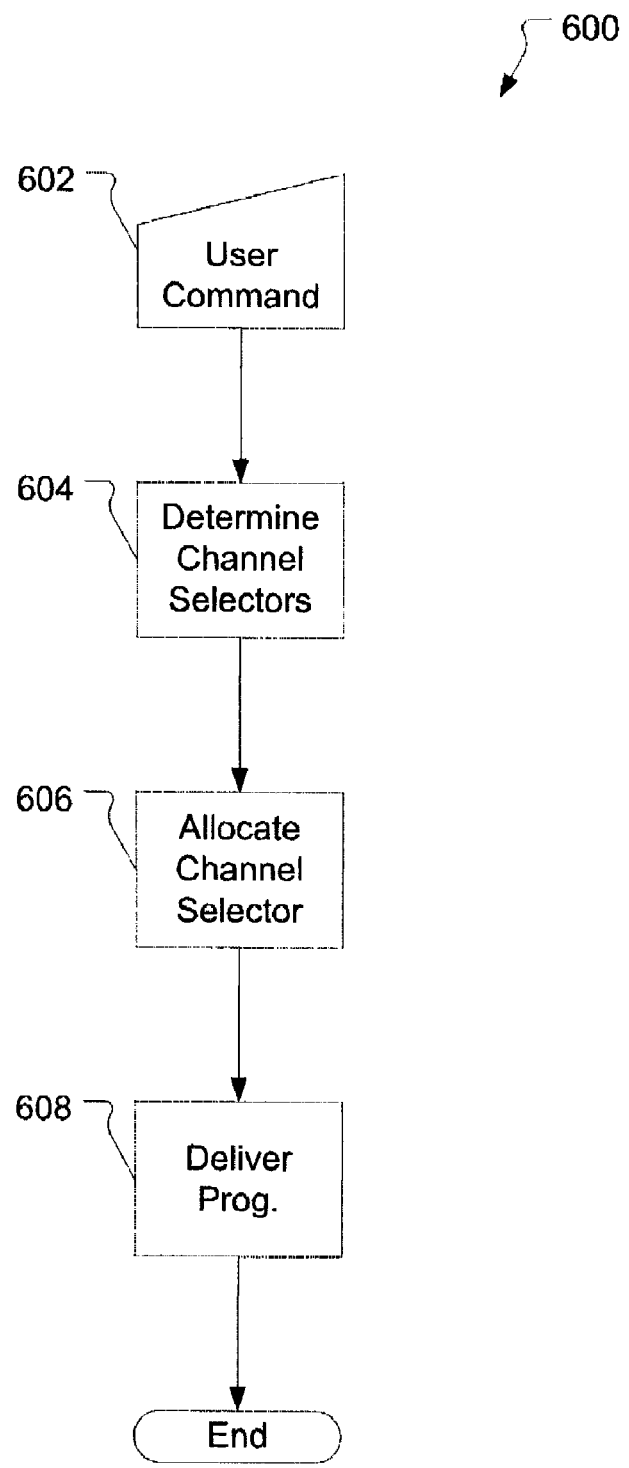
FIG. 6 illustrates the logical steps of one embodiment of a method of operating an STB with multiple channel selectors and an internal storage device.

Turning now to FIG. 6, the logical steps of an embodiment of a general method 600 of operating a STB with multiple channel selectors and an internal storage device, such as the one illustrated in FIG. 4, are presented. The method 600 begins when the STB receives a user command in a receiving step 602 that requires the use of a channel selector to deliver a channel of television programming to a specified TV.

Examples of commands that require a channel selector are a 'change channel' command (i.e., a command to display a different channel of television programming on a specific TV), a 'play stored programming' command (in an embodiment in which a channel selector is required to deliver stored television programming to a TV), a 'PIP display' command (to display a second channel of programming as a PIP display on a TV) and a 'record programming' command (if the programming to be recorded is not also being displayed).

Upon receiving the user command, a determining step 604 determines the channel selectors that are available to perform the command received in the receiving step 602. In the embodiment, the control electronics of the STB keep track of what duties each of the channel selectors are performing at any given time. Thus, information such as what channel a channel selector currently has selected and where each channel selector is delivering television programming is readily available for use during the determining step 604.

An example of a simple determining step 604 as applied to the embodiment illustrated in FIG. 2 would be: use only channel selector 2 206 to deliver television programming to TV 2 212; use only channel selector 2 206 to deliver television programming as a PIP display to TV 1 210; if channel selector 1 204 is not performing housekeeping functions, use channel selector 1 204 for delivering television programming to TV 1 210; if channel selector 1 204 is performing housekeeping functions and TV 2 212 is not in use, use channel selector 2 206 to deliver television programming to TV 1 210; and if channel selector 1 204 is performing housekeeping functions and TV 2 212 is in use, stop performing housekeeping functions and use channel selector 1 204 to deliver television programming to TV 1 210.

Based on results of the determining step 604, allocating step 606 allocates a channel selector to deliver the programming necessary to execute the command received in receiving step 602. Once a channel selector has been allocated, delivering step 608 delivers the programming necessary to execute the command received in the receiving step 602 using the allocated channel selector.

Figure 7:
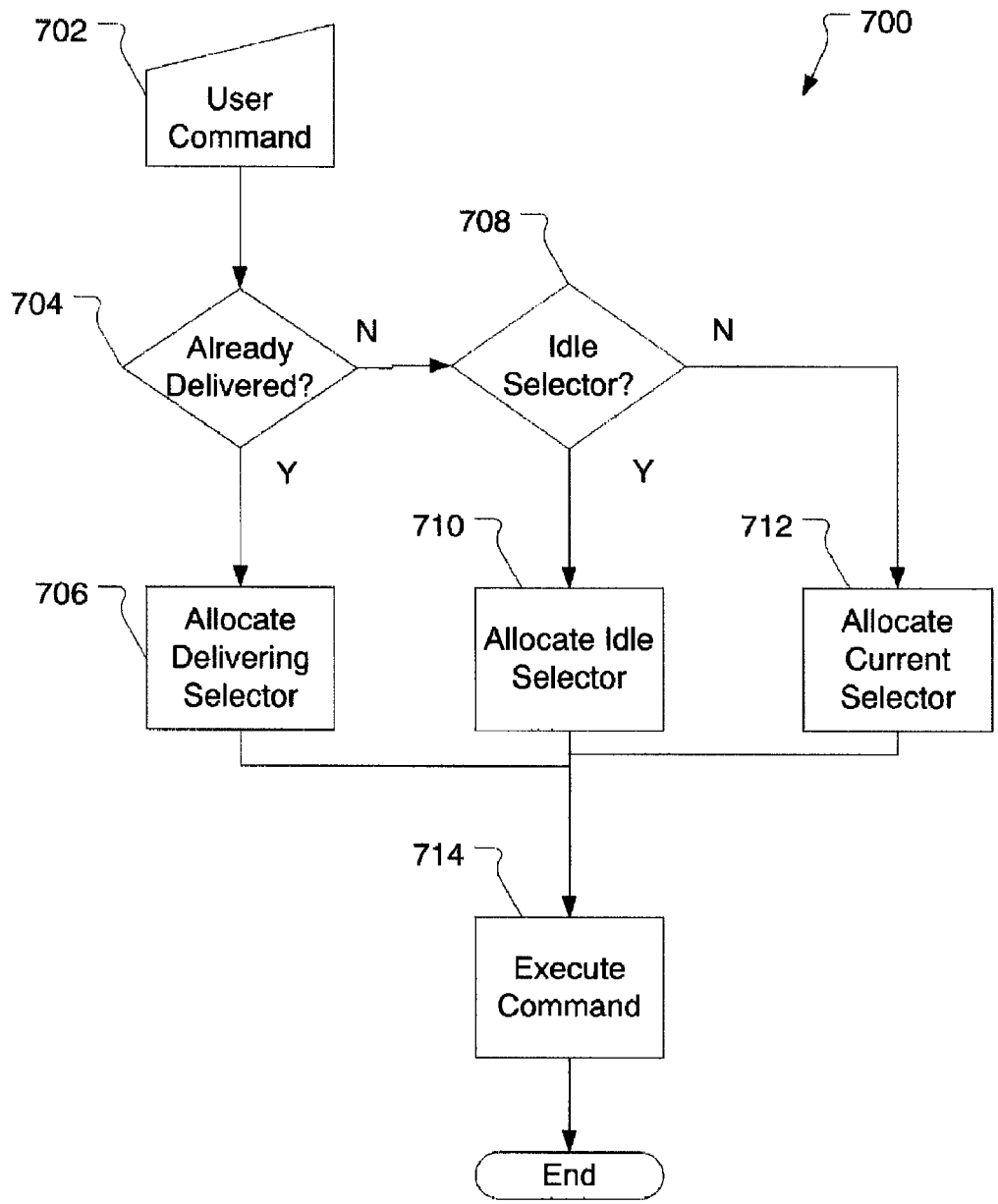
FIG. 7 presents the logical steps of a more detailed method of operating an STB with multiple channel selectors and an internal storage device.

FIG. 7 presents the logical steps of a more detailed method 700 of operating an STB with multiple channels selectors and an internal storage device. As in the general method 600, the method 700 begins when the STB receives a user command in a receiving step 702 that requires the use of a channel selector to deliver television programming. Next, a determination step 704 determines if the channel of programming requested by the user in the receiving step 702 is already selected by a channel selector.

There are several situations where this may occur. The user command may be to request delivery of a channel that is already being delivered to another TV or to the storage device. In addition, the user command may be to deliver a predetermined 'home' or favorite channel that channel selectors automatically select when idle or not otherwise directed to select specific channels as discussed above. If the determination step 704 determines that the requested channel is being delivered, then the allocating step 706 allocates the channel selector already delivering the channel of programming to deliver the programming necessary to execute the command received in the receiving step 702. In this situation, the allocated channel selector will be delivering television programming to more than one device simultaneously.

If the requested channel of programming is not already being delivered by a channel selector, then a second determination step 708 determines if there is an idle channel selector available for allocation. If there is an idle channel selector available, allocation step 710 allocates an idle channel selector to deliver the programming necessary to execute the command received in receiving step 702. If the second determination step determines that there is no idle channel selector available, in the embodiment illustrated, the channel selector currently delivering television programming to the user's TV is allocated by a third allocation step 712 to deliver the requested channels of programming received in the receiving step 702. Regardless of which channel selector is allocated, once a channel selector is allocated the delivering step 714 delivers the requested channel of television programming, completing the execution of the command received in the receiving step 702.

The detailed method 700 decreases the amount of time necessary to perform a change channel command and thus reduces the amount of tuner delay perceived by the user. By preferentially using the channel selector that is already delivering the desired channel, when such a channel selector is available, there is no tuner delay. Although it may take the electronics a finite amount of time to switch the data delivered to the TV, the delay will be far less than that associated with tuning to or selecting a new channel. Also, by preferentially using a channel selector other than the one currently delivering programming to the TV, the user will not experience a period during which the TV receives no television programming. Thus, method 700 reduces the user's perception of tuner delay.

Figure 8:
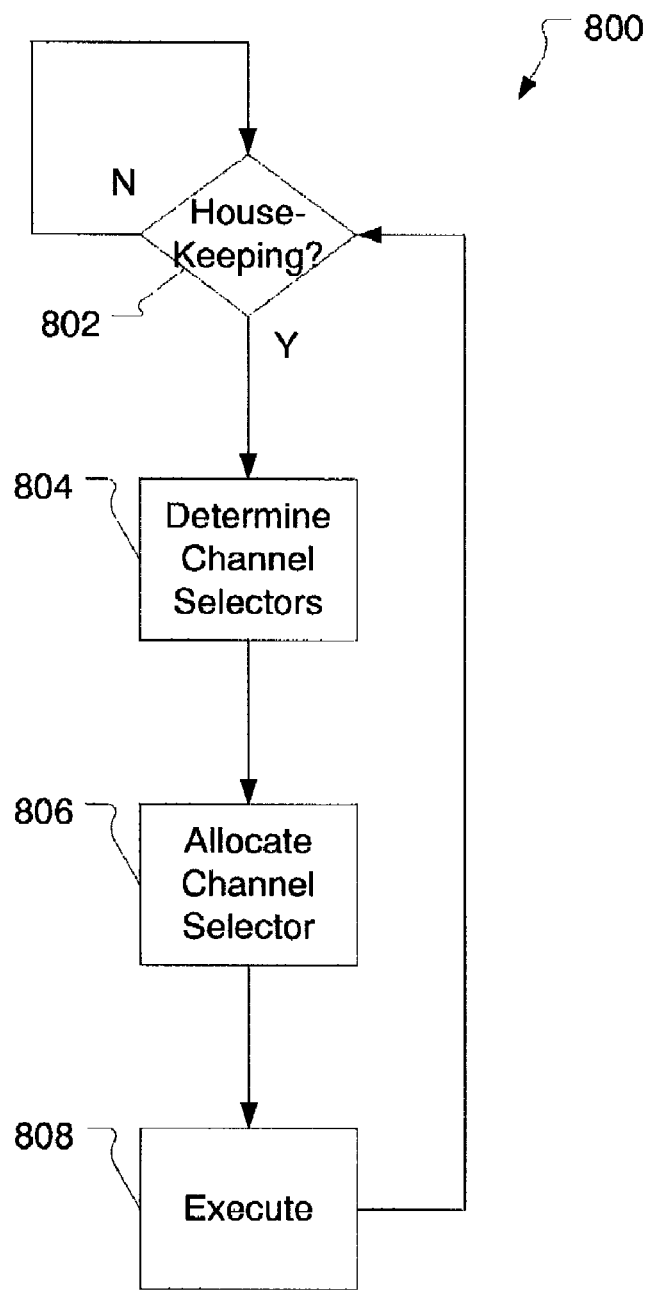
FIG. 8 presents the logical steps of a method of performing housekeeping operations on an STB with multiple channel selectors and an internal storage device.

FIG. 8 presents the logical steps of a method 800 of performing housekeeping operations on a STB with multiple channel selectors and an internal storage device. The STB determines when it is necessary to perform housekeeping in the determination step 802. This determination can be made based on the passage of time or can be in response to a condition of the STB or can be initiated by remote command, such as the receipt of a signal that new software is available from the television programming distributor. When it is determined that a housekeeping function needs to be performed and the housekeeping function requires the use of a channel selector, determining step 804 determines the channel selectors that are available to perform the necessary housekeeping function. Based on results of the determining step 804, allocating step 806 allocates a channel selector to deliver the channel comprising the housekeeping information necessary to perform housekeeping functions. Once a channel selector has been allocated, an execution step 808 uses the allocated channel selector to select the channel comprising the housekeeping information and deliver it to an appropriate internal device for the execution of the housekeeping function. This device may be the temporary buffer, the storage device, or the control electronics as necessary for the execution of the housekeeping function.

Figure 9:
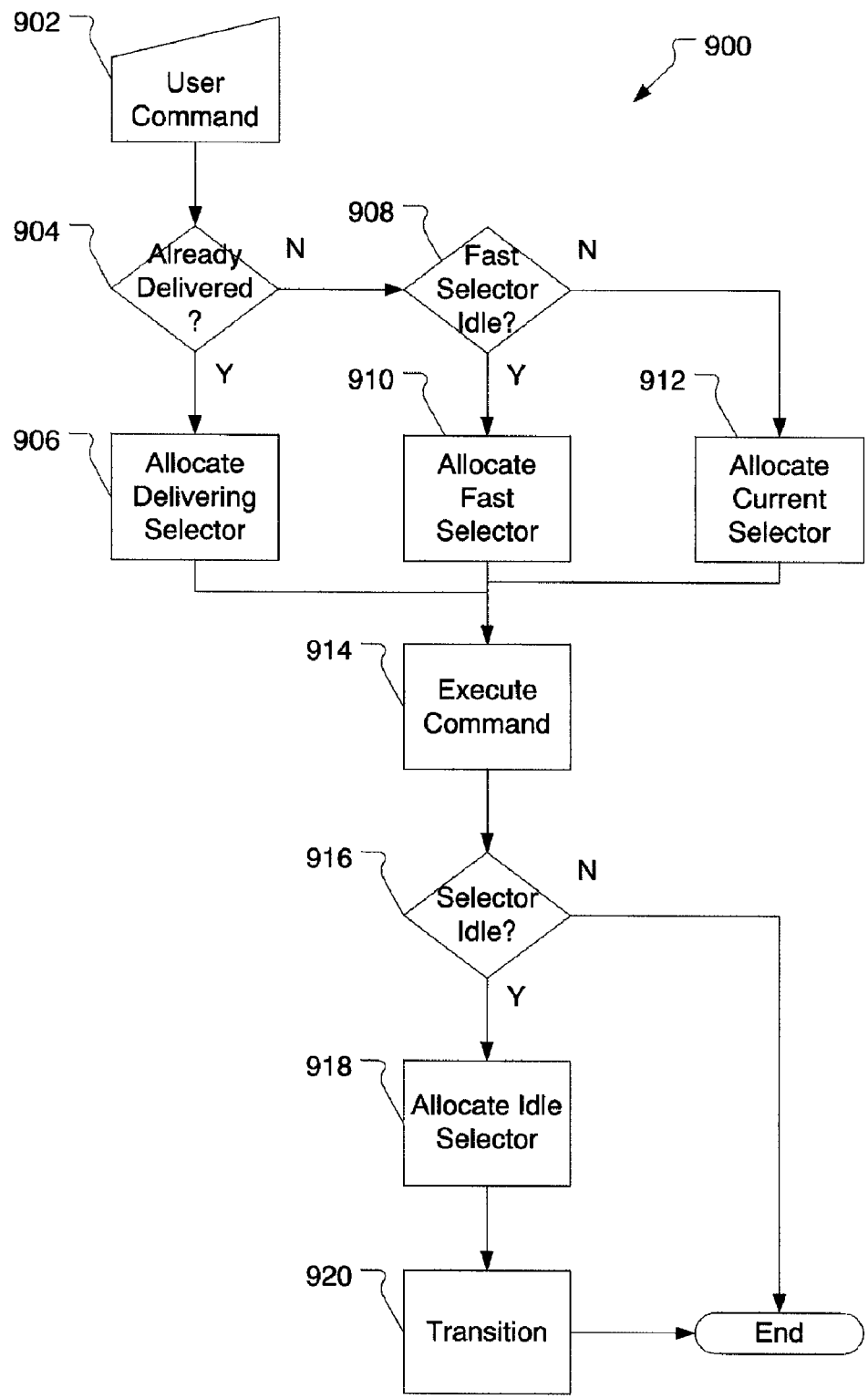
FIG. 9 presents the logical steps of an embodiment of a method of operating an STB with an internal storage device and multiple channel selectors, wherein one of the channel selectors has a substantially shorter tuner delay.

FIG. 9 presents the logical steps of an embodiment of a method 900 of operating a STB with an internal storage device and multiple channel selectors, wherein one of the channel selectors has a substantially shorter tuner delay (i.e., it is substantially faster at selecting a new channel and delivering television programming from it). Similar to the method shown in FIG. 6, the method reduces tuner delay perceived by the user, but this time by preferentially using the fast channel selector to perform all channel change commands wherever possible.

As FIG. 9 shows, the method 900 begins with the receipt of a user command in a receiving step 902 that requires the use of a channel selector to deliver a channel of television programming. Next, a determination step 904 determines if the channel of programming requested by the user in the receiving step 902 is already selected by a channel selector. If the determination step 904 determines that the requested channel is already being delivered, then the allocating step 906 allocates the channel selector already delivering the channel of programming to deliver the programming necessary to execute the command received in the receiving step 902. In this situation, the allocated channel selector will be delivering television programming to more than one device simultaneously.

If the requested channel of programming is not already being delivered by a channel selector, then a second determination step 908 determines if the fast channel selector is available for allocation. If the fast channel selector is available, then a second allocation step 910 allocates the fast channel selector to be used to execute the command received by the receiving step 902. If the fast channel selector is not idle and available for allocation, then in the embodiment illustrated a third allocating step 912 allocates the channel selector currently delivering television programming to the user's TV. Regardless of which channel selector is allocated, once a channel selector is allocated the delivering step 914 delivers the requested channel of television programming to the user's TV.

The method 900 then continues with a third determination step 916 that determines if there are any remaining channel selectors idle and available. If there are no idle channel selectors, then no further action is taken under this method 900. This situation may occur if all of the channel selectors on the STB are active and delivering programming at the time receiving step 902 receives the user command. However, if there is an idle channel selector available to be allocated, a fourth allocation step 918 allocates an idle channel selector to also execute the command received in the receiving step 902.

After the allocation of the fourth allocation step 918, a transition step 920 transitions delivery of the television programming from the fast channel selector to the second allocated channel selector allocated in the fourth allocation step 918. As part of the transition step 920, care is taken to ensure no interruption in television programming is perceived by the user. The transition step 920 also includes reallocating the fast channel selector, leaving it available for use in subsequent channel changes. By preferentially leaving the fast channel selector available as much as possible, the method 900 effectively uses the single fast channel selector to reduce tuner delay as much as possible.

The methods shown in FIGS. 6 through 9 are provided as examples to aid the reader's understanding of how the embodiments of the present invention might be operated. It will be obvious to the reader that the methods above are only generally presented and, depending on the exact embodiment of the present invention to which they are applied, may vary in differing amounts. Furthermore, as the methods are very suitable for implementation as software running on a processor within the control electronics, the exact algorithm used may be very different while achieving essentially the same results of choosing a channel selector from among several to effectuate a user command to deliver programming.

Figure 10:
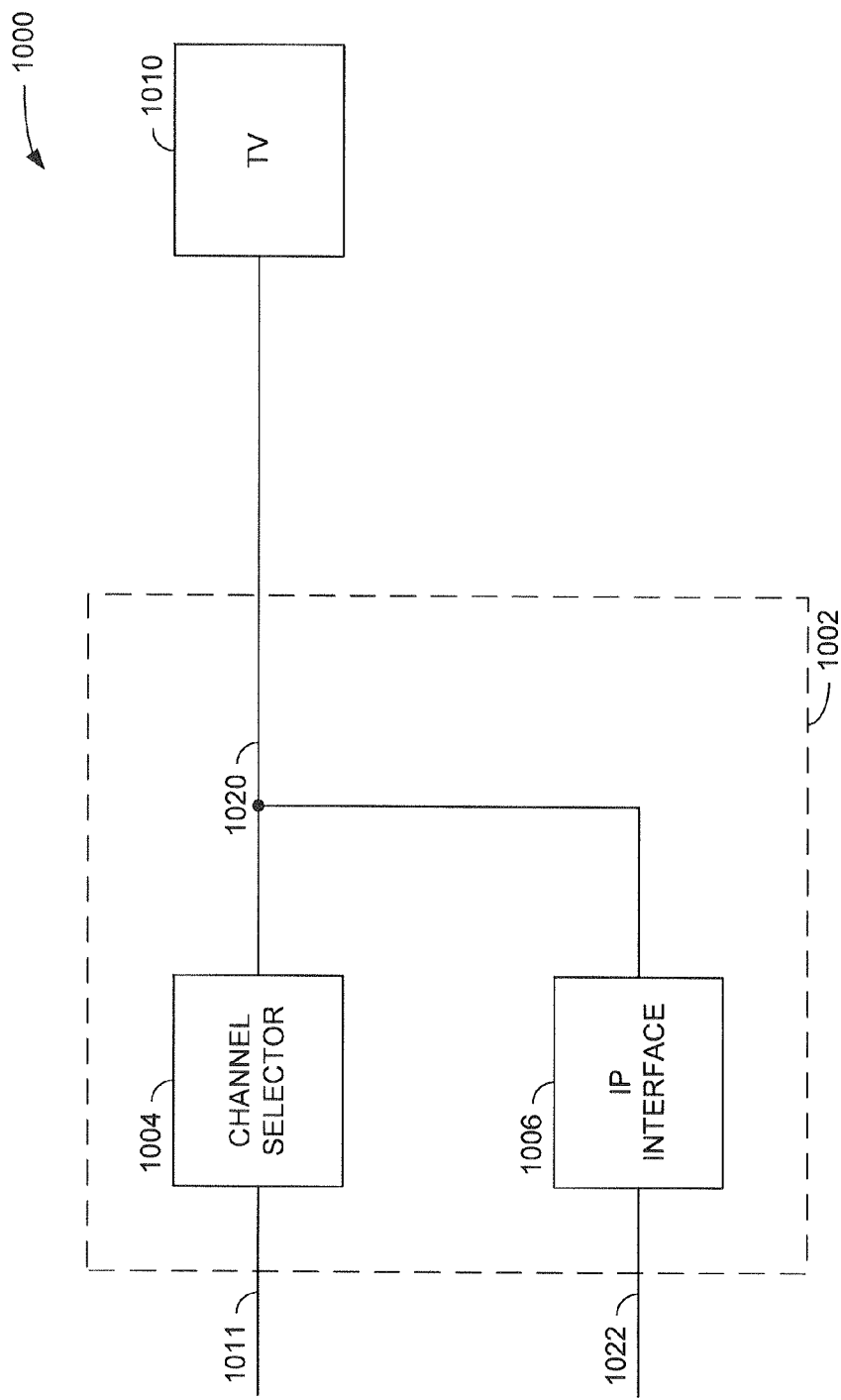
FIG. 10 illustrates a functional block diagram of one embodiment of an STB with a channel selector and an IP interface in accordance with the present invention.

As indicated above, the television programming received by an STB may include information delivered to the STB other than by way of a direct-to-home satellite. For example, the STB may also receive television programming and related information by way of a separate Internet Protocol (IP) connection. FIG. 10 depicts such an embodiment of an STB 1002 within an entertainment system 1000. The STB 1002 includes a channel selector 1004 and an IP interface 1006. As before, the channel selector 1004 is configured to receive multiple channels of television programming, such as by way of a signal 1011 containing the multiple channels. The channel selector 1004 may be configured to receive multiple channels of television programming from any of a number of sources, such as a direct-to-home or other broadcast satellite, a cable television provider or an over-the-air terrestrial broadcast station providing television programming in a digital or analog format. The channel selector 1004 is also configured to select one of the channels from the multiple channels, and deliver the selected channel to at least one TV 1010 coupled with the STB 1002. Also included is an IP interface 1006 configured to receive television programming over an IP connection 1022, and to deliver the television programming received over the IP connection to the at least one TV 1010.

In one embodiment, the STB 1002 of FIG. 10 includes a bus 1020 coupling the channel selector 1004 and the IP interface 1006 to the TV 1010 by way of a port of the STB 1002. In another embodiment, the channel selector 1004, the IP interface 1006, and the TV 1010 may be coupled together by way of one or more switches within the STB 1002, such as the switch 220 of FIG. 2.

Figure 11:
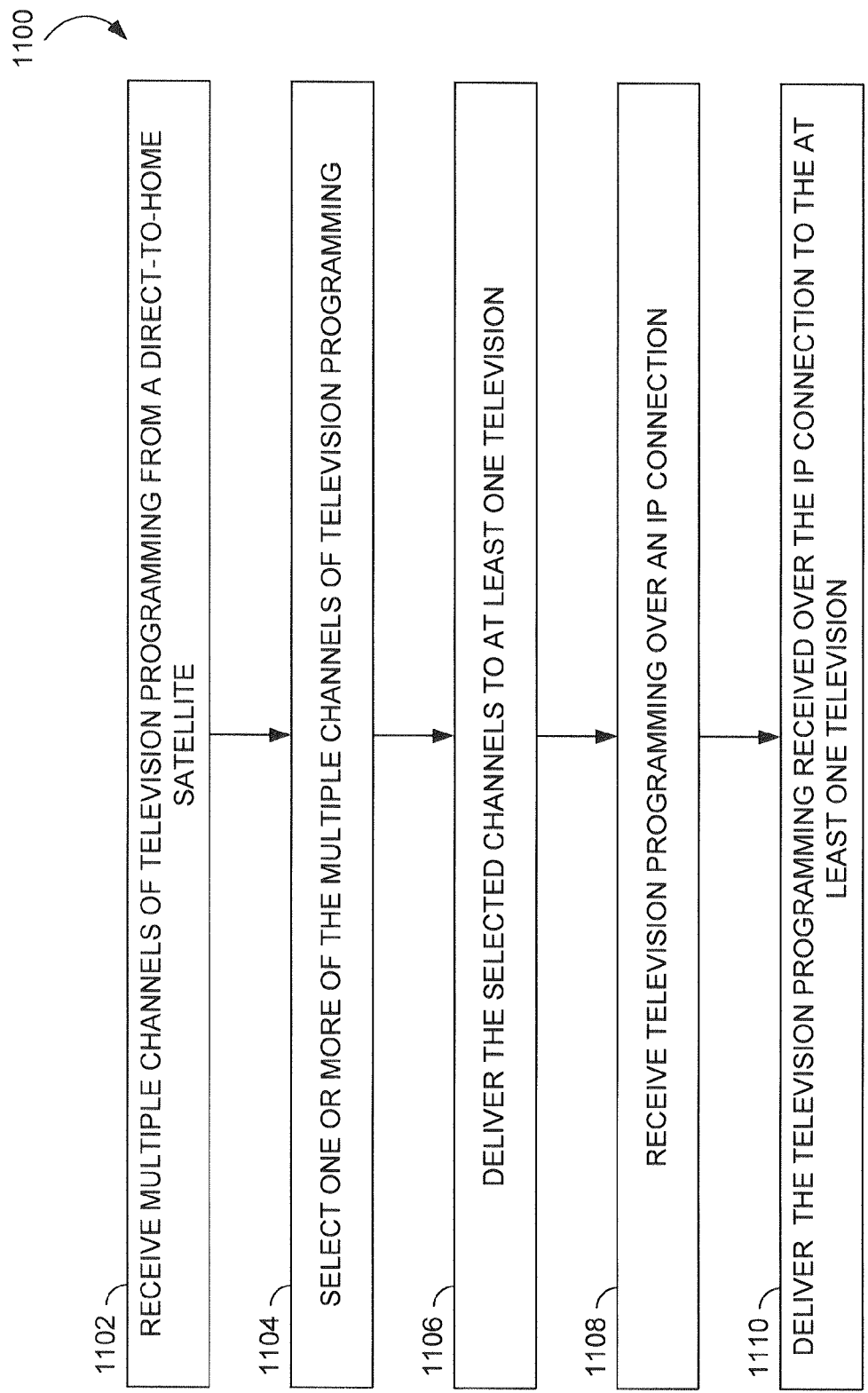
FIG. 11 presents the logical operations of an embodiment of a method of operating an STB with a channel selector and an IP interface.

A method 1100 for receiving television programming, such as by way of the STB 1002 of FIG. 10, is illustrated in FIG. 11. In the method 1100, multiple channels of television programming are received from a satellite, cable, and/or over-the-air terrestrial broadcasting source (operation 1102). One or more of the multiple channels of television programming are then selected (operation 1104) and delivered to at least one TV (operation 1106). Also, television programming is received over an IP connection (operation 1108) and delivered to the TV (operation 1110). One possible device for performing the method 1100 is the STB 1002 of FIG. 10. However, alternative devices or components may be employed to perform the method 1100 in other embodiments. Also, while one specific order of operation is depicted in FIG. 11, other possible orders in which to execute the various operations are possible, including concurrent or simultaneous operation of two or more operations, while remaining within the scope of the invention.

Figure 12:
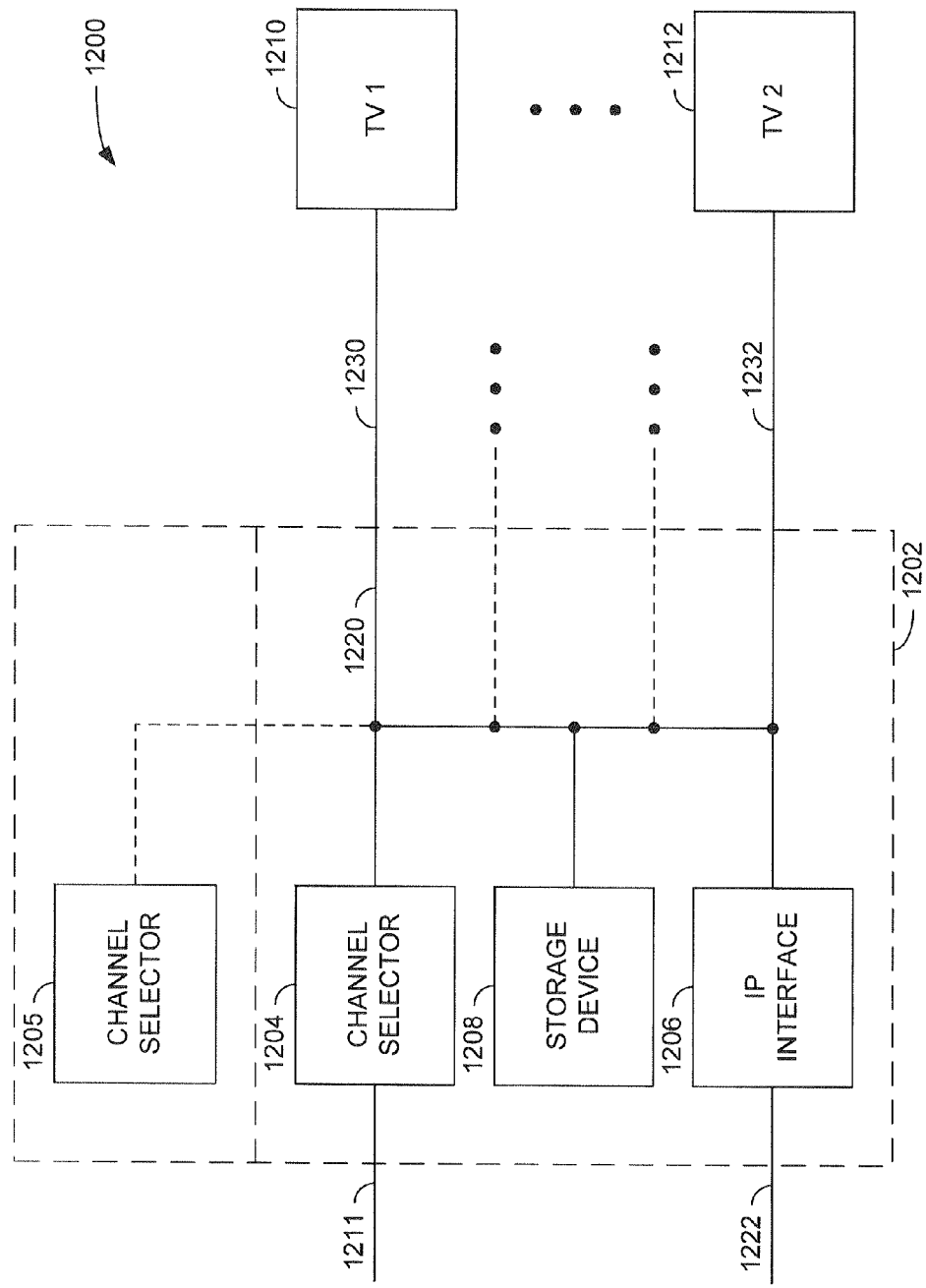
FIG. 12 illustrates a functional block diagram of an embodiment of an STB with at least one channel selector, an IP interface, and a storage device in accordance with the present invention.

Another embodiment of a television converter device—an STB 1202—is depicted within an entertainment system 1200 shown in FIG. 12. The entertainment system includes the STB 1202, a first TV 1210 and a second TV 1212. Each of the first TV 1210 and the second TV 1212 is coupled to separate ports 1230, 1232 of the STB 1202. In one embodiment, additional TVs may also be coupled to the ports 1230, 1232 shown in FIG. 12, to separate ports of the STB 1202 not shown in FIG. 12, or some combination thereof. In another implementation, the entertainment system 1200 may further incorporate other components or equipment not shown in FIG. 12, such as an audio sound amplification system coupled with one or more external speakers.

The STB 1202 includes at least one channel selector 1204, an IP interface 1206, and a storage device 1208, such as a hard disk drive or other form of nonvolatile memory. Other components, such as a remote controller interface for receiving user commands, control electronics, and a processor executing software or firmware for controlling the various components of the STB 1202, similar to those described above in connection with FIG. 1b, may also be present in the STB 1202. These additional components are not shown in FIG. 12 or discussed in great detail herein to facilitate clarity in the following discussion.

The channel selector 1204 is configured to receive multiple channels of television programming via a signal 1211 from a broadcast satellite, such as direct-to-home satellite (typically by way of a satellite antenna and LNBF, as discussed above), a cable broadcast system, a terrestrial over-the-air broadcast station, or similar source of broadcast programming. The STB 1202 may also contain one or more additional channel selectors 1205 to allow the simultaneous selection of more than one channel from the multiple channels of television programming received from the satellite. Each of the channel selectors 1204, 1205 separately may receive programming from any or all of the broadcast sources listed above, depending on the particular implementation. The channel selectors 1204, 1205 are also configured to deliver the selected channels to any of the TVs 1210, 1212 coupled with the STB 1202, as described in earlier embodiments presented above.

In a fashion similar to the IP interface 1006 of the STB 1002 of FIG. 10, the IP interface 1206 shown in FIG. 12 is configured to receive television programming over an IP connection 1222, and to deliver the programming to any of the TVs 1210, 1212. Examples of the physical implementation of the IP connection 1222 include, but are not limited to, a digital subscriber line (SDL) connection, a coaxial cable connection, an Ethernet connection, and a wireless connection. The IP interface 1206 may also perform any demodulation, de-packetizing, or any other processing required for delivery of the programming to the TVs 1210, 1212.

In one embodiment, the IP connection 1222 couples the IP interface with any of a number of Internet servers (not shown in FIG. 12) that are capable of delivering video and audio programming to the STB 1202. Such a server may be coupled with a database of movies, news features, entertainment programs, and the like, and capable of delivering such programming over the Internet to the STB 1202. In one implementation, the server may be operated by the same commercial entity operating the satellite from which the multiple channels of television programming are received by the channel selectors 1204, 1205. As a result, the IP interface 1206 may serve as a conduit for receiving programming on-demand. Also, the IP interface 1206 may serve as a backup path for receiving programming associated with one or more of the multiple channels normally received from the satellite or other source through the channel selectors 1205.

In another embodiment, the IP interface 1206 may be coupled with a television programming database (also not shown in FIG. 12) by way of the IP connection 1222 within a local area network (LAN), thus allowing viewing of any program of the database by way of the TVs 1210, 1212. For example, a user may store a collection of home movies and other programming on a home computer coupled with the STB 1202 by way of the IP connection 1222. In another implementation, a corporation may couple the STB 1202 with a database of training videos, promotional material, and the like via the IP connection 1222. Many other possibilities exist as well.

In one embodiment, the IP interface 1206 may "stream" television programming received over the IP connection 1222 to at least one of the TVs 1210, 1212 with little or no buffering of the programming within the STB 1202. In another implementation, the IP interface 1206 may buffer some or all of the programming being received before initiating delivery of the programming to the TVs 1210, 1212. The programming may be buffered within a temporary buffer located within the IP interface 1206 in one case. Alternatively, the temporary buffer 156 noted in FIG. 1b may be employed instead. In another example, the IP interface 1206 may utilize the storage device 1208 as a buffer for accumulating the programming before beginning delivery of the programming to the TVs 1210, 1212. The storage device 1208 is described in greater detail below.

The existence of one or more channel selectors 1204, 1205 and the IP interface 1206 allows support for PIP functionality in much the same way as described above. For example, programming from any of the selectors 1204, 1205 and the IP interface 1206 may be displayed in either a main viewing area or a PIP window of any of the TVs 1210, 1212. In addition to the PIP scenarios discussed above, such flexibility may enable a user to view programming received over the IP connection 1222 in a main viewing area while monitoring a selected channel from one of the channel selectors 1204, 1205 in a PIP window, or vice versa.

Similar to other embodiments described above, the storage device 1208 is coupled to each of the channel selectors 1204, 1205 and the IP interface 1206 so that the storage device 1208 may record therein programming received from the selectors 1204, 1205 and the IP interface 1206. The storage device 1208 is also coupled to each of the TVs 1210, 1212 so that the storage device 1208 may deliver the recorded programming to any of the TVs 1210, 1212. In the embodiment of FIG. 12, the storage device 1208 is coupled to the channel selectors 1204, 1205, the IP interface 1206, and the TVs 1210, 1212 by way of a single bus 1220. As a result, neither the channel selectors 1204, 1205 nor the IP interface 1206 are required to deliver recorded content from the storage device 1208 to any of the TVs 1210, 1212. In another embodiment, the storage device 1208 may instead be coupled with the TVs 1210, 1212 through any or all of the channel selectors 1204, 1205 and the IP interface 1206, in a fashion similar to that depicted in FIG. 4.

In addition to the channel selectors 1204, 1205 and the IP interface 1206, the storage device 1208 may serve as a source of programming to be displayed in a PIP mode (e.g., to a main viewing area or a PIP window) to any of the TVs 1210, 1212. For example, a user may watch a program recorded on the storage device 1208 in a main viewing area of one of the TVs 1210, 1212 while monitoring either a selected channel from one of the channel selectors 1204, 1205 or programming received through the IP interface 1206 in a PIP window of the same TV.

The storage device 1208 may also allow the viewing of programming at one or more of the TVs 1210, 1212 while the same programming is currently being recorded from any of the channel selectors 1204, 1205 or the IP interface 1206. In this mode, a user may use the STB 1202 to quickly review portions of the programming while the programming is still being recorded. Further, the storage device 1208 may be configured to always temporarily record the selected channels of the channel selectors 1204, 1205, as well as programming received over the IP connection 1222 into the IP interface 1206, to allow a user to replay portions of programming currently being viewed without commanding the STB 1202 to explicitly record the programming.

Depending on the data transfer rates and bandwidths associated with the storage device 1208 and the bus 1220, some embodiments of the invention are capable of supporting the transfer of multiple programs within the STB 1202 concurrently. For example, programming from one or more of the channel selectors 1204, 1205 may be delivered to either the storage device 1208, or to one or more TVs 1210, 1212, at the same time programming from the IP interface 1206 is being recorded at the storage device 1208 or delivered to the TVs 1210, 1212. In some cases, the storage device 1208 may be able to record one or more programs from the channel selectors 1204, 1205 and the IP interface 1206 concurrently while programming is being delivered from one of these same sources to at least one of the TVs 1210, 1212, and vice-versa. Further, the storage device 1208 may record programming from each of the channel selectors 1204, 1205 and the IP interface 1206 while delivering previously-recorded programs stored on the storage device 1208 to one or more of the TVs 1210, 1212.

In one embodiment, the operation of the channel selectors 1204, 1205, the IP interface 1206, and the storage device 1208 is guided by way of commands issued by a user to the STB 1202. Typically, such commands are received by way of a remote control, as described above. In addition, the STB 1202 may include one or more timers programmable by the user to control the recording of the television programming received via the channel selectors 1204, 1205 and the IP interface 1206, as well as the delivery of that programming to the TVs 1210, 1212.

As discussed earlier, the STB 1202 may provide for display at the TVs 1210, 1212 an electronic program guide (EPG) that provides information associated with the programming available through the STB 1202 for viewing or recording. In the embodiment of FIG. 12, the EPG provides information, such as day, time, and channel, regarding the programs available via the selector channels 1204, 1205 and the IP interface 1206. In one embodiment, the programming information concerning the programming received over the IP connection 1222 is displayed as one or more virtual channels providing substantially real-time streaming of programming. The EPG may also list programming available over the IP connection 1222 as programs retrievable on demand from a server or similar component accessible by way of the IP connection 1222. The EPG may be received over any or all of the channel selectors 1204, 1205 and the IP interface 1206, depending on the specific implementation.

As noted above, STBs typically receive and employ housekeeping information, such as information employed to update the EPG stored on the STB and software used to operate the STB. In the STB 1202 of FIG. 12, the housekeeping information may be delivered over either the signal 1211 received by the channel selectors 1204, 1205 or the IP connection 1222 coupled with the IP interface 1206. Further, a determination as to whether the signal 1211 or the IP connection 1222 is utilized to receive the housekeeping information may be based upon which, if any, of the channel selectors 1204, 1205 and the IP interface 1206 are currently idle (i.e., not delivering programming to either the TVs 1210, 1212 or the storage device 1208), as explained in detail above.

In one embodiment, the IP interface 1206 may transmit as well as receive information over the IP connection 1222. For example, programming previously received through the channel selectors 1204, 1205 or the IP interface 1206 may be retransmitted subsequently via the IP interface 1206 over the IP connection 1222 to a destination external to the STB 1202, such as another STB or a computer. This programming may be transferred directly from the channel selectors 1204, 1205, the IP interface 1222, or the storage device 1208. Also, the EPG, housekeeping information, and other information that may be received by the STB 1202 may also be transmitted over the IP connection 1222 by way of the IP interface 1206.

While several embodiments of the invention have been discussed herein, other embodiments encompassed by the scope of the invention are possible. For example, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A video converter device, comprising:
   an output port connecting the video converter device to at least one display device;
   a channel selector configured to receive multiple channels of programming, to select one of the channels from the multiple channels, and to deliver the selected channel to at least one display device via the output port;
   an Internet Protocol (IP) interface configured to receive programming over an IP connection, and to deliver the programming received over the IP connection to the at least one display device via the output port; and
   at least one processor configured to provide via the output port to the at least one display device an electronic program guide comprising timing information for the programming received by the channel selector and the IP interface, wherein the timing information for at least some of the programming received by the IP interface is displayed in the electronic program guide as at least one virtual channel providing streaming of the programming over the IP interface;
   wherein the video converter device bidirectionally communicates with a second video converter device utilizing the IP interface to retransmit from the video converter device the programming received through the IP interface and the multiple channels of programming received through the channel selector to the second video converter device via the IP interface.

2. The video converter device of claim 1, wherein the channel selector is configured to receive multiple channels of programming from at least one of a broadcast satellite, a cable broadcast system, and an over-the-air terrestrial broadcast station.

3. The video converter device of claim 1, further comprising a second channel selector configured to receive the multiple channels, select another one of the channels from the multiple channels, and to deliver the other selected channel to the at least one display device.

4. The video converter device of claim 1, wherein the IP connection comprises at least one of a digital subscriber line connection, a coaxial cable connection, an Ethernet connection, and a wireless connection.

5. The video converter device of claim 1, wherein the IP interface is configured to stream the programming received over the IP connection to the at least one display device.

6. The video converter device of claim 1, wherein the IP interface is configured to buffer at least a portion of the programming received over the IP connection before delivering the programming to the at least one display device.

7. The video converter device of claim 1, wherein the IP interface is configured to deliver programming to the at least one display device as a picture-in-picture display.

8. The video converter device of claim 1, further comprising a storage device configured to record programming from the channel selector and the IP interface, and deliver the recorded programming to the at least one display device.

9. The video converter device of claim 8, wherein the storage device is configured to record programming from the channel selector and from the IP interface concurrently.

10. The video converter device of claim 9, wherein the storage device is configured to record programming from the channel selector and the IP interface concurrently while at least one of the channel selector and the IP interface delivers at least a portion of the programming to the at least one display device.

11. The video converter device of claim 9, wherein the storage device is configured to deliver programming previously stored therein to the at least one display device while recording programming from the channel selector and the IP interface concurrently.

12. The video converter device of claim 8, further comprising at least one timer configured to control the recording of programming by the storage device from the channel selector and the IP interface.

13. The converter device of claim 1, wherein the IP interface is configured to receive the electronic program guide.

14. The video converter device of claim 1, wherein at least some of the video programming received over the IP connection comprises on-demand video programs, and wherein the electronic program guide comprises information identifying the on-demand video programs.

15. A method for receiving video programming, the method comprising:
    receiving multiple channels of video programming from a video programming broadcasting source;
    selecting one or more of the multiple channels of video programming;
    delivering the selected channels to at least one display device;
    receiving video programming over an Internet Protocol (IP) connection;
    delivering the video programming received over the IP connection to the at least one display device;
    transferring to the at least one display device for display thereon an electronic program guide comprising timing information for the video programming received from the video programming broadcasting source and the video programming received over the IP connection, wherein the timing information associated with at least some of the video programming received over the IP connection is presented in the electronic program guide as at least one virtual channel providing the programming received over the IP connection; and
    bidirectionally communicating with an external destination utilizing the IP connection to retransmit over the IP connection the video programming received over the IP connection and the multiple channels of video programming received from the video programming broadcasting source to the external destination.

16. The method of claim 15, further comprising:
    recording the video programming of the selected channels;
    delivering the recorded video programming of the selected channels to the at least one display device;
    recording the video programming received over the IP connection; and
    delivering the recorded video programming received over the IP connection to the at least one display device.

17. The method of claim 16, further comprising delivering previously-recorded video programming to the at least one display device while recording the video programming of the selected channels and the video programming received over the IP connection concurrently.

18. The method of claim 15, wherein the electronic program guide is received over the IP connection prior to transferring the electronic program guide for display on the at least one display device.

19. The method of claim 18, further comprising retransmitting the electronic program guide over the IP connection to a video converter device.

20. The method of claim 15, further comprising receiving housekeeping information over the IP connection.

21. The method of claim 20, further comprising retransmitting the housekeeping information over the IP connection to a video converter device.

22. A non-transitory computer-readable storage medium comprising instructions executable on a processor for employing a method for receiving video programming, the method comprising:
    receiving multiple channels of video programming from a video programming broadcast source comprising at least one of a broadcast satellite, a cable broadcast system, and an over-the-air terrestrial broadcast station;
    selecting one or more of the multiple channels of video programming;
    delivering the selected channels to at least one display device;
    receiving video programming over an Internet Protocol (IP) connection;
    delivering the video programming received over the IP connection to the at least one display device;
    transferring to the at least one display device for display thereon an electronic program guide comprising timing information for the video programming received from the video programming broadcast source and the video programming received over the IP connection, wherein the timing information for at least a portion of the video programming received over the IP connection is presented in the electronic program guide as at least one virtual channel carrying the programming received over the IP connection at a predetermined time; and
    bidirectionally communicating with a video converter device utilizing the IP connection to retransmit over the IP connection the video programming received over the IP connection and the multiple channels of video programming received from the video programming broadcast source to the external destination.

* * * * *